R. R. KARICH.
AXLE COUPLING FOR HUB ODOMETERS.
APPLICATION FILED APR. 25, 1919.
1,368,505.
Patented Feb. 15, 1921.
2 SHEETS—SHEET 1.
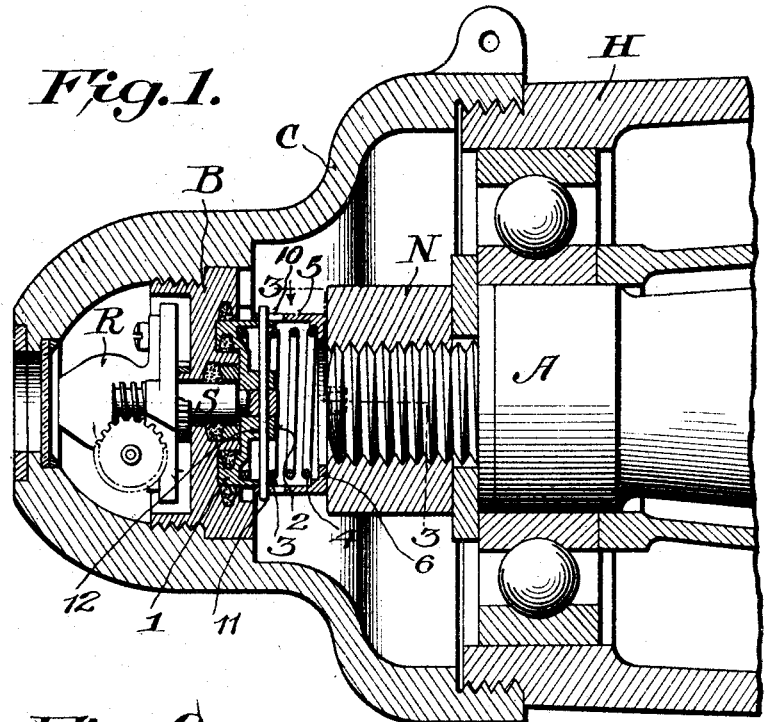
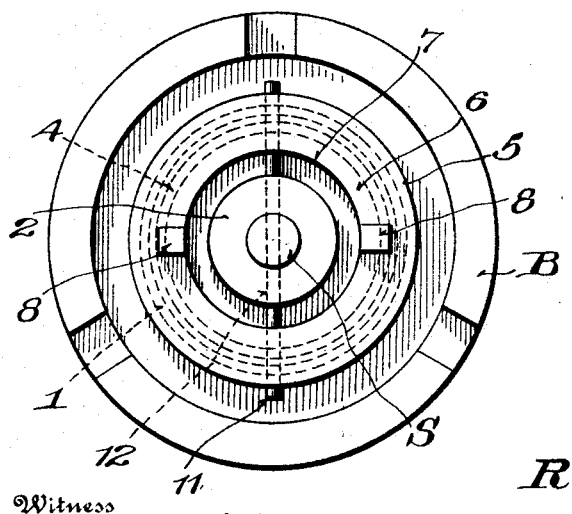
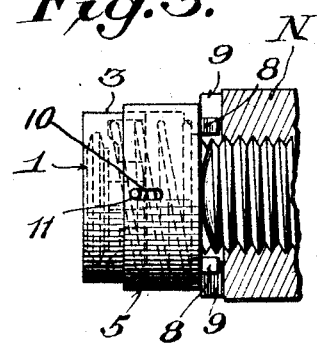
Inventor
Rudolph R. Karich,

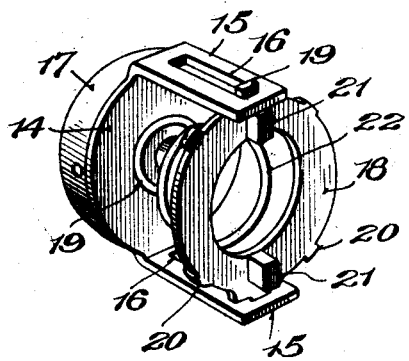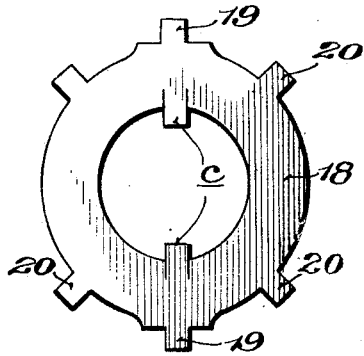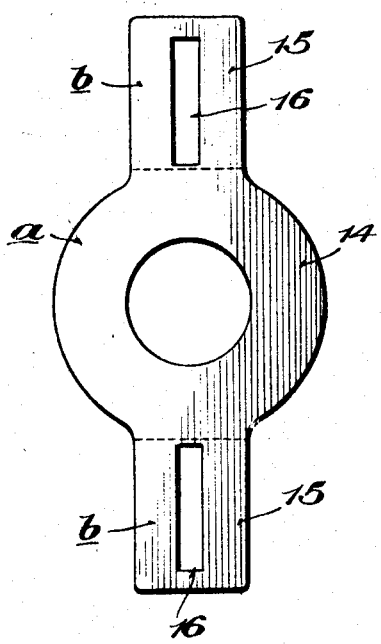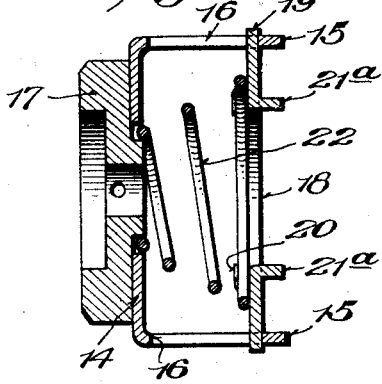

UNITED STATES PATENT OFFICE.

RUDOLPH R. KARICH, OF WOODHAVEN, NEW YORK, ASSIGNOR TO THE AMERICAN TAXIMETER COMPANY, OF NEW YORK, N. Y., A CORPORATION OF NEW YORK.

AXLE-COUPLING FOR HUB-ODOMETERS.

1,368,505.      Specification of Letters Patent.      Patented Feb. 15, 1921.

Application filed April 25, 1919. Serial No. 292,735.

*To all whom it may concern:*

Be it known that I, RUDOLPH R. KARICH, a citizen of the United States, residing at Woodhaven, Long Island, in the county of Queens and State of New York, have invented certain new and useful Improvements in Axle-Couplings for Hub-Odometers, of which the following is a specification.

This invention relates to hub-odometers, and more particularly to an improved axle coupling for operatively connecting the register or counter with a stationary axle part.

A primary object of the invention is to provide a simple, practical and reliable device which will readily interlock with the castellations of the axle nut, whereby the register device supported within the odometer casing will be held stationary while the said casing rotates with the wheel. In this connection it is proposed to provide a construction which has ample resiliency in the line of the axis of the support for the register and the wheel axle, but which is particularly adapted to withstand rotary twisting strains due to maintaining the register and its operating connections stationary while the exterior casing rotates.

A further object of the invention is to provide a construction which is economical to manufacture and easily and quickly assembled, thereby facilitating quantity production.

With the above and other objects in view which will more readily appear as the nature of the invention is better understood, the same consists in the novel features, combination and arrangement of parts hereinafter more fully described, illustrated and claimed.

Preferred and practical embodiments of the invention are shown in the accompanying drawings, in which:—

Figure 1 is a vertical sectional view of a hub-odometer showing the arrangement of operating parts therein and the application of one of the present driving connections.

Fig. 2 is a plan view of the form of coupling device shown in Fig. 1 mounted on the driving plate that is carried in the odometer housing.

Fig. 3 is a side elevation of the construction of Figs. 1 and 2 showing more clearly the interlock between the yieldable member of the coupling and the axle-nut.

Fig. 4 is a perspective view of a practical commercial embodiment of the invention.

Fig. 5 is a plan view of the stamping from which one member of the coupling is made.

Fig. 6 is a plan view of the stamping from which the other member may be made.

Fig. 7 is a vertical sectional view of a complete device embodying the locking ring made from the stamping shown in Fig. 6.

Similar reference numerals designate corresponding parts throughout the several figures of the drawings.

The present invention is susceptible of general application to hub-odometers of the type wherein any suitable register device is employed, such as that indicated in Fig. 1 as R for instance, and which register device is held stationary with reference to the driving plate B which is fitted in and rotates with an exterior protecting casing C attached to a wheel hub H. In this type of hub-odometer the said plate B has loosely journaled therein a shaft or spindle S of the support for the register R, and to hold the latter in a fixed position it is necessary to connect said spindle S with the stationary axle A, or preferably the lock-nut N thereon. To this end a coupling device such as shown in Figs. 3 or 4 is employed.

The coupling devices proposed by the present invention each essentially consist of a base member for engaging with the spindle which is a part of the support for the register or counter mechanism, and an axle-part engaging member slidably connected to or interlocked with the said base member, and a spring between these two members for placing the latter under pressure, whereby it may engage with an axle-part, such for instance as the castellations of the axle nut, with a snap action. In the foregoing connection it is important to note that the present coupling connects the register or counter direct with the axle to thus hold the same fixed and therefore distinguishes from hub-odometer driving connections wherein a gear or like driving element is secured to one of the members thereof, and the register or counter revolves with the wheel.

The present invention is therefore directed solely to a coupling for connecting the register or counter with a stationary axle-part, whereby the counter and its support becomes in effect a continuation or extension of the axle on which the wheel is mounted, rather than a part of the wheel, the latter itself merely acting through proper means as the driving instrumentality.

Referring to the novel structural features and characteristics of the connector coupling shown in Figs. 1 to 3 inclusive, it will be observed that the same preferably includes in its organization a base member 1 which is provided with a central hub portion 2 for receiving the end of the spindle S, and an outer upstanding housing flange portion 3. This construction of the base provides an annular groove between the hub and the flange for receiving one end of coiled spring 4 whose opposite end is completely surrounded by and housed within a locking sleeve 5 provided with the retaining flange 6 at one end while its opposite end telescopically engages with the flange 3 of the base. It will be observed that the said flange 6 which constitutes an abutment for the spring 4 is relatively narrow to thereby provide a central clearance opening 7, so that in case the threaded end of the axle A projects beyond the nut N, the said locking sleeve 5 under the pressure of the spring 4 may be forced into contact with the face of the nut to insure that the opposite locking or key studs 8 carried by the flange will engage in the castellations 9 of the axle nut.

For the purpose of preventing the relative rotation of the locking sleeve 5 with reference to the flange 3 of the base, the said sleeve is provided at diametrically opposite points with elongated slots 10, whereby a relatively long locking pin 11, which may be inserted through alined openings 12 in both the flange 3 and hub 2, will serve the double purpose of locking the base 1 to the spindle S and also locking the sleeve against relative rotation on the flange 3. Although the sleeve 5 is locked against circumferential movement with reference to the base 1, it will be observed that owing to the elongated slots 10 the said locking sleeve 5 will have ample movement in the direction of its axis to insure the resiliency of the spring 4 being exercised to cause the flange 6 of the sleeve to be maintained in contact with the face of the nut so that the locking studs or keys 8 will be positively held in the castellations 9.

By reference to the manner of using the device it will be apparent that the attaching base 1 may be fitted to the supporting member or plate B in such a manner that the spindle S will project through the hub portion 2. The spring 4 is then seated in the annular groove between the hub and flange and protected by the latter, after which the locking sleeve 5 may be placed over the spring to compress the same and telescopically engage with the flange 3, whereupon the relatively long locking key 11 may be inserted through the slots 10 and alined openings 12 in the flange 3 and hub 2 to hold all of the various parts in their correct assembled relation.

When the odometer casing having the present connector therein is fitted to the wheel hub H, the locking studs or keys 8 will automatically snap into opposite castellations on the nut N and thereby automatically effect the desired coupling or connection between the stationary axle-part and the spindle S, or its equivalent, associated with the register mechanism.

Referring to the embodiment of the invention shown in Figs. 4 to 7 inclusive, it will be observed that these figures illustrate a construction which is particularly advantageous from a commercial standpoint, by reason of the fact that the several parts thereof may be made by simple and inexpensive stamping operations. That is to say, the base 14 may be made from a stamping such as is shown in Fig. 5 which includes the relatively large disk-like intermediate portion $a$ with the oppositely extending arms $b$, which when bent up at right angles to the plane of the portion $a$ provide the upstanding arms 15. These arms are preferably provided with the slots 16 which may be punched therein at the time of making the stamping and before the arms are bent up into their final position. The said base 14 preferably has suitably secured thereto an attaching disk 17 for fitting over the central hub portion of the driving plate B and connecting with the spindle S of the counter such as shown in Fig. 1 for example.

The locking member in this form of the invention is preferably a ring 18 which may be provided with the opposite guide projections 19 for sliding in slots 16 and the spring retaining lugs 20, while the face thereof carries oppositely located axle engaging studs or their equivalents 21. As shown in Fig. 4, the studs 21 may be welded or riveted to the face of the ring 18, but they may also be readily formed as a part of the ring itself as shown in Fig. 6, which illustrates a ring made by a stamping operation with the inwardly projecting tongues $c—c$. These tongues $c—c$ may be bent up at right angles to the face of the plate as shown in Fig. 7 to provide the axle-part engaging studs 21$^a$.

For the purpose of maintaining the locking ring 18 in proper relation to the base 16 a helical spring 22 is preferably employed, and with this construction it will be apparent that the normal position of the ring 18 will be such that the projections 19 will be yieldingly held in the outer ends of the slots 16, that is the ends opposite the base 14, whereby the locking ring will at all times be maintained in a position to automatically snap into engagement with the castellations of the lock nut on the axle.

A practical and important feature of all forms of the invention is the construction which permits of accommodating the threaded end portion of the axle which may project beyond the lock nut. That is to say, in both forms of the invention the locking member is in the form of a ring which provides a relatively large central clearance opening so that in case the axle projects beyond the nut, a positive engagement between the locking studs or projections carried by the ring and the castellations of the axle nut will be assured. Furthermore, in all forms of the invention, the relatively fixed and movable members are securely locked against relative rotary movement which is an important consideration in the accurate functioning of hub-odometers, while at the same time the necessary resiliency between the movable member which has a relatively floating relation between the fixed axle-part and the odometer structure proper, is always maintained.

Without further description it is thought that the features and advantages of the present invention will be readily apparent, and it will of course be understood that minor changes may be resorted to without departing from the spirit of the invention or scope of the appended claims.

I claim:

1. An axle coupling unit for hub-odometers including a member adapted to be attached to the odometer, said member being of substantially U-shaped cross section, an axle nut engaging member slidably interlocked therewith, and a spring interposed between the base and nut engaging member.

2. An axle coupling unit for hub-odometers including a base, and an axle nut engaging member consisting of a ring having a central clearance opening of greater diameter than the axle and carrying projections for engaging with the castellations of the axle nut, and yielding means between the base and axle nut engaging member.

3. An axle coupling unit for hub-odometers including a base having a portion thereof off-set to one side, an axle nut engaging member interlocked with the off-set portion of said base to prevent relative circumferential movement between the two members, and a spring interposed between the base and nut engaging member.

4. An axle coupling unit for hub-odometers including an odometer engaging member and an axle nut engaging member, means for locking the members against relative circumferential movement and constituting guide means for permitting their movement in the direction of their axes, a spring exerting its influence in the direction of the axes of the members, and means carried by the axle engaging member for interlocking with an axle part.

5. An axle coupling for hub-odometers consisting of a base, having slotted arm portions, a locking ring having offset stationary axle-part engaging elements and oppositely disposed projections for engaging with the slotted arm portions of the base, and a spring interposed between the base and ring.

6. An axle coupling for hub-odometers consisting of a base, having slotted arms bent up at right angles thereto, a ring having opposite offset axle engaging elements and diametrically extending projections for engaging with the slotted arms of the base, and a spring confined between the base and ring.

7. An axle coupling for hub-odometers consisting of a base consisting of a relatively large intermediate portion with oppositely slotted arms bent at right angles to said intermediate portion, a locking member consisting of a ring provided with diametrically opposite portions for engaging with the slotted arms, and also provided with downwardly projecting spring retaining lugs and axle-part engaging projections carried by the face of said ring, and a spring arranged between said ring and base.

In testimony whereof I hereunto affix my signature in the presence of two witnesses.

RUDOLPH R. KARICH.

Witnesses:
F. DUCASSE,
B. C. PALMER.